US007991890B2

(12) United States Patent
Schmidt et al.

(10) Patent No.: US 7,991,890 B2
(45) Date of Patent: Aug. 2, 2011

(54) GAME CONSOLE COMMUNICATION WITH A DEVICE

(75) Inventors: Brian Lloyd Schmidt, Bellevue, WA (US); Christopher M. Pirich, Seattle, WA (US); Derek H. Smith, Snohomish, WA (US); Gregory A. Martinez, Seattle, WA (US); Jon Marcus Randall Whitten, Sammamish, WA (US); Joshua G. Poley, Redmond, WA (US); Maciej Maciesowicz, Duvall, WA (US); Michael Cory Maston, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1443 days.

(21) Appl. No.: 10/954,680

(22) Filed: Sep. 30, 2004

(65) Prior Publication Data

US 2006/0068910 A1 Mar. 30, 2006

(51) Int. Cl.
*G06F 15/173* (2006.01)
(52) U.S. Cl. ...................................................... 709/226
(58) Field of Classification Search .................. 709/226, 709/230
See application file for complete search history.

(56) References Cited

U.S. PATENT DOCUMENTS

| | | | | |
|---|---|---|---|---|
| 5,721,951 | A | 2/1998 | DorEl | 395/830 |
| 5,826,082 | A * | 10/1998 | Bishop et al. | 718/104 |
| 6,694,381 | B1 * | 2/2004 | Lo et al. | 710/5 |
| 6,716,102 | B2 | 4/2004 | Whitten et al. | 463/63 |
| 6,899,627 | B2 * | 5/2005 | Lam et al. | 463/40 |
| 6,973,555 | B2 * | 12/2005 | Fujiwara et al. | 711/170 |
| 7,003,588 | B1 * | 2/2006 | Takeda et al. | 463/46 |
| 7,165,255 | B2 * | 1/2007 | Czajkowski et al. | 718/104 |
| 7,177,957 | B2 * | 2/2007 | Vance | 709/220 |
| 7,337,431 | B1 * | 2/2008 | Barnes et al. | 717/124 |
| 2003/0014513 | A1 * | 1/2003 | Ruths et al. | 709/223 |
| 2003/0051038 | A1 * | 3/2003 | Spicer et al. | 709/229 |
| 2003/0061260 | A1 * | 3/2003 | Rajkumar | 709/104 |
| 2004/0014526 | A1 * | 1/2004 | Kulas | 463/43 |
| 2004/0133689 | A1 * | 7/2004 | Vasisht | 709/220 |
| 2004/0254013 | A1 * | 12/2004 | Quraishi et al. | 463/29 |
| 2005/0002419 | A1 * | 1/2005 | Doviak et al. | 370/466 |
| 2005/0009468 | A1 * | 1/2005 | Morozumi | 455/39 |
| 2005/0062888 | A1 * | 3/2005 | Wood et al. | 348/553 |

OTHER PUBLICATIONS

Bjork, S. et al., "Special Issue on Ubiquitous Games", *Personal and Ubiquitous Computing*, 2002, 6, 358-361.
Jensen, C.D., "CryptoCache: A Secure Sharable File Cache for Roaming Users", *Department of Computer Science, Trinity College Dublin*, 73-78.
Lehrbaum, R., "Linux Opens Up Your TV", Jul. 29, 2004, pp. http://delivery.acm.org, 4 pages.
Magerkurth, C. et al., "Towards the Next Generation of Tabletop Gaming Experiences", *Canadian Human-Computer Communications Society in the Proceedings of Graphics Interface*, 2004, 73-80.
Rouse, III. Richard., "The Console and PC: Separated at Birth?", *Computer Graphics*, May 2001, 5-9.

(Continued)

*Primary Examiner* — Benjamin R Bruckart
(74) *Attorney, Agent, or Firm* — Woodcock Washburn LLP

(57) ABSTRACT

Communication between a game console having a communication port and a portable device is facilitated by determining that a portable device has been directly connected to the communication port, determining the protocol associated with the portable device, and communicating with the portable device using a driver associated with the determined protocol. An ancillary application may handle the communication between the game console and the portable device while a game or entertainment application executes concurrently on the game console. The game application may execute in a reserved predetermined amount of hardware resources of the game console while the ancillary application may execute concurrently using the remaining hardware resources.

17 Claims, 7 Drawing Sheets

OTHER PUBLICATIONS

Spinellis, D.D., "The Information Furnace: Consolidated Home Control", *Pers Ubiquit Comput*, 2003, 7, 53-69.

Turnbull, J.G., "Introducing Home Area Networks", *BT Technology Journal*, 2002, 20(2), 30-38.

\* cited by examiner

GAME CONSOLE COMMUNICATION WITH A DEVICE

FIELD OF THE INVENTION

The invention generally relates to the field of game consoles. In particular, the invention relates to communication between a game console and a multimedia device, as well as other devices.

BACKGROUND OF THE INVENTION

Traditionally, game consoles were standalone systems that accommodated a limited number of players, such as 1-4 players, that remain local to the game console. A recent trend in game consoles is to provide capabilities to facilitate gaming among multiple players over a network, such as Internet-based online gaming. These online game consoles allow players to compete with other players, regardless of their geographic location. Beyond the limited trend towards online gaming, game consoles have been provided with little connectivity to other devices.

SUMMARY OF THE INVENTION

The following is a summary to provide a basic understanding of some aspects of the invention. This summary is not intended as an extensive overview of the invention, nor is it intended to identify key elements of the invention or to delineate the scope of the invention. Its sole purpose is to present some aspects of the invention in a simplified form as a prelude to the more detailed description presented below Communication between a game console having a communication port and a portable device is facilitated by determining that a portable device has been directly connected to the communication port, determining the protocol associated with the portable device, and communicating with the portable device in accordance with the determined protocol. An ancillary application may handle the communication between the game console and the portable device while a game or other entertainment application executes concurrently on the game console. The game application may execute in a reserved predetermined amount of hardware resources of the game console while the ancillary application may execute concurrently using the remaining hardware resources. The communication port may be a Universal Serial Bus (USB) port.

The ancillary application may communicate with the portable device in accordance with various protocols or standards, such as, for example, Media Transfer Protocol (MTP), USB Mass Storage Specification, Picture Transfer Protocol (PTP), HID driver protocol, Firewire protocol, a proprietary protocol, a variation of the mentioned protocols, and the like. The ancillary application may communicate with the portable device via a driver associated with the protocol of the portable device. To save memory, the driver may not support the full set of protocol features but instead may support only a subset of the protocol features.

The ancillary application may implement various application. For example, the ancillary application may allow the game console user to store and retrieve game application configuration settings and game controller configuration settings to and from the portable device. In this manner, a user may store a saved game, a "left-handed" controller configuration, and the like to the portable device for possible uploading to another game controller at a different location. The ancillary application may also allow the game console user to store and retrieve multimedia files to and from the portable device. In this manner, a user may connect their MP3 or WMA player, digital camera, or other portable multimedia device to the game console and play the multimedia files via the game console. Further, the ancillary application may allow the game console user to easily configure their wireless home network by executing a wireless network configuration wizard and storing the wireless network configuration information to a Universal Serial Bus flash configuration device, or the like.

Additional features of the invention will be made apparent from the following detailed description of illustrative embodiments that proceeds with reference to the accompanying drawings.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings illustrative embodiments of the invention; however, the invention is not limited to the specific methods and instrumentalities disclosed. In the drawings.

DETAILED DESCRIPTION OF ILLUSTRATIVE EMBODIMENTS

Figure 1:
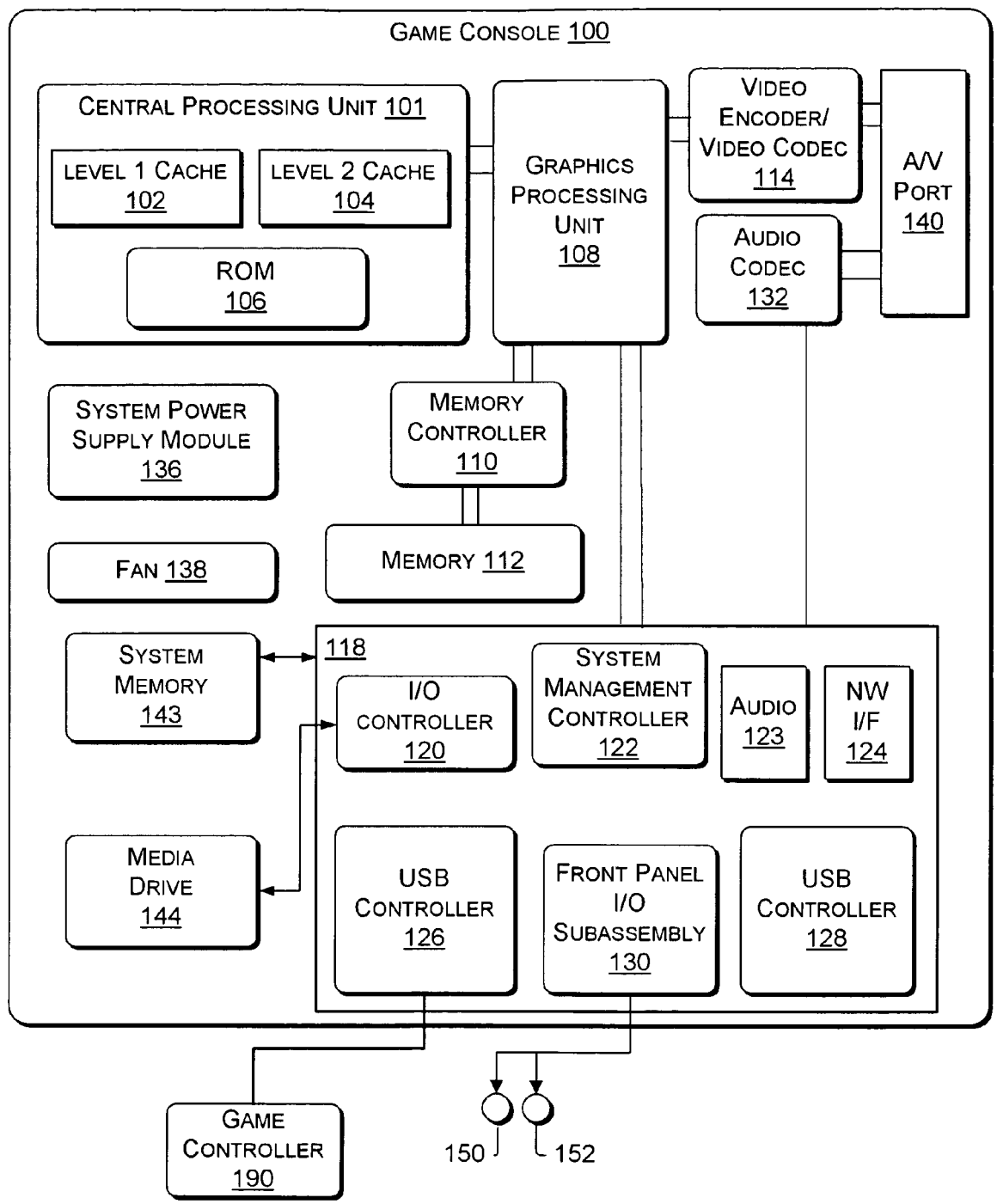
FIG. 1 is a block diagram showing an illustrative game console in which aspects of the invention may be implemented.

FIG. 1 illustrates the functional components of a game console 100 with which aspects of the invention may be implemented. The game console 100 has a central processing unit (CPU) 101 having a level 1 (L1) cache 102, a level 2 (L2) cache 104, and a flash ROM (Read-only Memory) 106. The L1 cache 102 and L2 cache 104 temporarily store data and hence reduce the number of memory access cycles, thereby improving processing speed and throughput. The flash ROM 106 may store executable code that is loaded during an initial phase of a boot process when the game console 100 is powered.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a user interface, such as, for example, a television or other display. A memory controller 110 is connected to the GPU 108 and CPU 101 to facilitate processor access to various types of memory 112, such as, but not limited to, a RAM (Random Access Memory).

Figure 2:
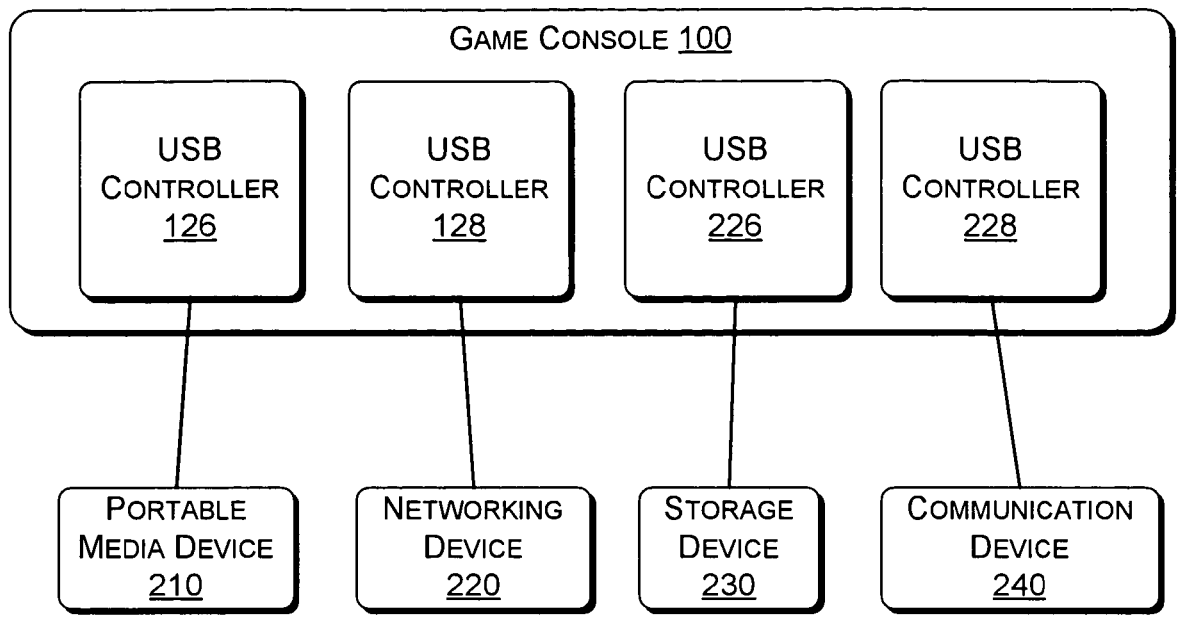
FIG. 2 is a block diagram showing the illustrative game console of FIG. 1 directly connected to various exemplary devices, in accordance with aspects of the invention.

The game console 100 includes an I/O controller 120, a system management controller 122, an audio processing unit 123, a network interface controller 124, a first Universal Serial Bus (USB) host controller 126, a second USB controller 128 and a front panel I/O subassembly 130 that are preferably implemented on a module 118. While two USB controllers 126 and 128 are shown in FIG. 1, there may be three, four (such as shown in FIG. 2), or any number of USB controllers. USB controllers 126 and 128 may be used to communicate with a variety of devices, including portable multimedia devices, and the like, as described in more detail below. USB controllers 126 and 128 include USB ports for connection to a variety of USB compatible multimedia devices.

The network interface controller 124 provides access to a network (e.g., the Internet, home network, and the like) and may be any of a wide variety of various wired or wireless interface components including an Ethernet card, a modem, a Bluetooth module, a cable modem, and the like.

Game console 100 may communicate with game controller 190 via USB controller 126, as shown in FIG. 1. Game controller 190 typically functions as an input device to game console 100 whereby a user may input information into game console 100 via the game controller 190 while "playing" a game application. Game controller 190 may include a gamepad, buttons, and the like.

System memory 143 stores application data that is loaded during the boot process. A media drive 144 is provided and may comprise a DVD/CD drive, hard drive, or other removable media drive, and the like. Application data may be accessed via the media drive 144 for execution, playback, etc. by the game console 100. The media drive 144 is connected to the I/O controller 120 via a bus, such as a Serial ATA bus or other high speed connection (e.g., IEEE 1394).

The system management controller 122 provides a variety of service functions related to assuring availability of the game console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the game console 100. A system power supply module 136 provides power to the components of the game console 100. A fan 138 cools the circuitry within the game console 100.

The CPU 101, GPU 108, memory controller 110, and various other components within the game console 100 are interconnected via one or more buses, including serial and parallel buses, a memory bus, a peripheral bus, and a processor or local bus using any of a variety of bus architectures.

When the game console 100 is powered on or rebooted, application data may be loaded from the system memory 143 into memory 112 and/or caches 102, 104 and executed on the CPU 101. The application may present a graphical user interface that provides a consistent user experience when navigating to different media types available on the game console 100. In operation, game applications and/or other media contained within the media drive 144 may be launched or played from the media drive 144.

The game console 100 may be operated as a standalone system by connecting the system to a television or other display. In this standalone mode, the game console 100 allows one or more local users to interact with the system and play game applications. However, with the integration of broadband connectivity made available through network interface 124 or the wireless adapter 148, the game console 100 may further be operated as a participant in a larger network community.

Because of the high processing demand of gaming applications, game console 100 typically dedicates a large percentage of processing time and resources to the gaming application and distributes the remaining processing time and resources to other applications, such as servicing devices connected to USB controllers 126, 128, and the like.

Game console 100 (or any other multimedia console that dedicates a percentage of processing time and resources to a multimedia application) may allow a game application to retain substantial control over the hardware resources of the game console 100, so that game developers can rely on having a certain amount of processing time and resources. For example, game console 100 may reserve a predetermined amount of game console hardware resources for game applications while the remainder of hardware resources are controlled by other applications (such as communicating with multimedia devices connected to the game console 100). In this manner, the game application retains substantial control over hardware resources, unlike applications executing in conventional personal computing (PC) operating systems which have little control over hardware resources. As such, game applications do not need to directly support ancillary functionalities. Instead, such ancillary functionalities may be implemented in the remaining (non-dedicated) hardware resources of game console 100.

In order to present a consistent, unchanging resource usage signature for the game applications, a number of different game console resources may be managed. These various resources may include the CPU 101, cache memory 102, 104, main memory 112, audio channels, game controller input, and the like. For example, an operating system kernel of the game console 100 may reserve resources for game applications. The operating system kernel may reserve a predetermined amount of memory for game applications and typically does not make this reserved memory available to the other applications. The kernel, drivers, and any other game-related code, including the game application, may reside in this reserved memory. If the game application requires less than the full amount of available dedicated memory, the kernel typically still allocates and reserves the predetermined amount of memory so that the game application sees a consistent amount of available memory. In particular, the memory reservation may be large enough to contain the launch kernel, game application, and drivers. Typically, this reservation allows enough remaining resources for new ancillary applications and drivers over the life of the game console 100, as well as any anticipated expansion in the size of the ancillary applications and driver footprint. Alternatively, game console 100 may reserve resources for the ancillary application or for both the game application and the ancillary application.

Further, the operating system kernel may reserve a second predetermined amount of memory for use in communication between the game application and the ancillary applications. Such communication may occur, for example, when an ancillary application receives a user request that should cause some action to occur in the game application. For example, if an ancillary application receives a request to display a digital picture, this should typically cause the game application to pause. This second predetermined amount of memory can be used to transmit information to the game application, causing the game application to pause.

The operating system kernel may also reserve a predefined number of audio channels (monophonic streams) for use by ancillary applications (e.g., ten audio channels may be reserved out of roughly 300 available channels in a typical game console 100).

The operating system kernel loads drivers that may include a GPU driver that sets up an interrupt. The interrupt may be a GPU interrupt, such as, for example, a programmable scan line interrupt that generates an interrupt when the video output reaches a predetermined scan line on the video display or may be another suitable interrupt source. The GPU interrupt may be used to keep in synch with the GPU video frame and ancillary applications may be scheduled in response to a scan line interrupt from the GPU.

Game console 100 may also include an MP3 decoder, a WMA decoder, and the like for decoding audio (e.g., music) files or other files. The operating system kernel may load decoders and the like into memory or the decoders may be loaded into memory when appropriate. In this manner, game console 100 can provide for playing music without some intermediary device, such as a personal computer. That is, as described in more detail below, an MP3 player may be directly connected to game console 100 and the music can be played via the game console 100.

In a multiprocessor game console, the reservation of CPU time (e.g., implemented via interrupts or other techniques) may be distributed among the CPUs in various fashions. For example, the game application may be executed on a first CPU (and may also be executed on the other CPUs) with no ancillary applications being executed on the first CPU. Ancillary applications may be scheduled at times on the other CPUs. Ancillary applications may be scheduled for X % of CPU processing time on a second CPU and Y % of CPU processing time on a third CPU. Further, the X % and Y % of processing time may be scheduled at the end of processing a video frame. The X % and Y % of processing time may be equal (i.e., symmetric) or non-equal (i.e., asymmetric). Further, the determinations of the X % and Y % of processing time may be based on design requirements for ancillary applications.

Both the game application and the ancillary application may expect to receive user input, however, conventional game applications have complete control over user input (e.g., via game controller 190, "gamepad" input). Game console 100, however, appropriately manages or shares the user input (e.g., game controller 190 input) between the game application and the ancillary applications. Typically, game applications are not aware of when they lose user input focus from the game controller 190 to an ancillary application or when it is restored back to the game application. Therefore, gamepad state (e.g., what game controller 190 buttons are pressed) is maintained when user input focus is switched between the game application and the ancillary application. Further, the state set on the gamepad in the game application, while the game application does not have the input focus, may be queued and maintained until the user input focus is returned to the game application. For example, if the game application sets a gamepad vibration state (e.g., a state in which a vibration generating motor runs in the gamepad to cause the gamepad itself to vibrate) while the ancillary application has the user input focus, this vibration state is queued (and updated) to be consistent when the user input focus is restored to the game application. The input devices are not reserved resources, but are switched between the game application and the ancillary application such that each will have the appropriate focus of the device. An application manager may control the switching of input stream, without the game application's knowledge, and a driver may maintain state information regarding focus switches. Other types of user interaction are possible, such as pausing the game application when the user interacts with an ancillary application, etc.

FIG. 2 is a block diagram of various exemplary devices being directly connected to the game console 100. In the illustrative game console 100 shown in FIG. 2, there are four USB controllers 126, 128, 226, 228. Each USB controller may be connected to a variety of exemplary devices. For example, as shown in FIG. 2, USB controller 126 is directly connected (rather than being connected via a network) to a portable media device 210, USB controller 128 is directly connected to a networking device 220, USB controller 226 is directly connected to a portable storage device 230, and USB controller 228 is directly connected to a communication device 240. While the exemplary devices are shown as being directly connected to USB ports of game console 100, game console 100 may include other communication ports for direct connection to the exemplary devices.

Figure 3A:
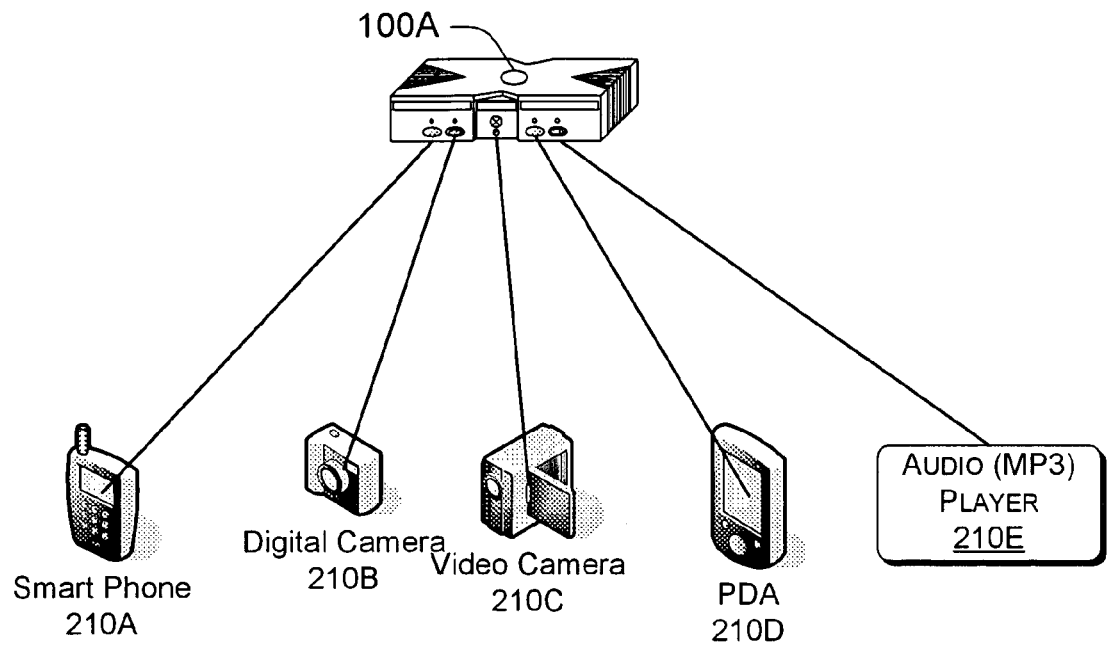
FIGS. 3a, 3b, 4a, and 4b are diagrams showing the illustrative game console of FIG. 1 directly connected to particular exemplary devices, in accordance with aspects of the invention.

Portable media device 210 may be any portable media device compatible with the communication ports of game console 100 (i.e., USB controller 126) including, for example, smart portable phone 210A, digital camera 210B, video camera 210C (which may be Firewire compatible), personal digital assistant (PDA) 210D, audio player 210E (which may be a MP3 player, a player compatible with WMA files, etc.), and the like, as shown in FIG. 3a.

Figure 3B:
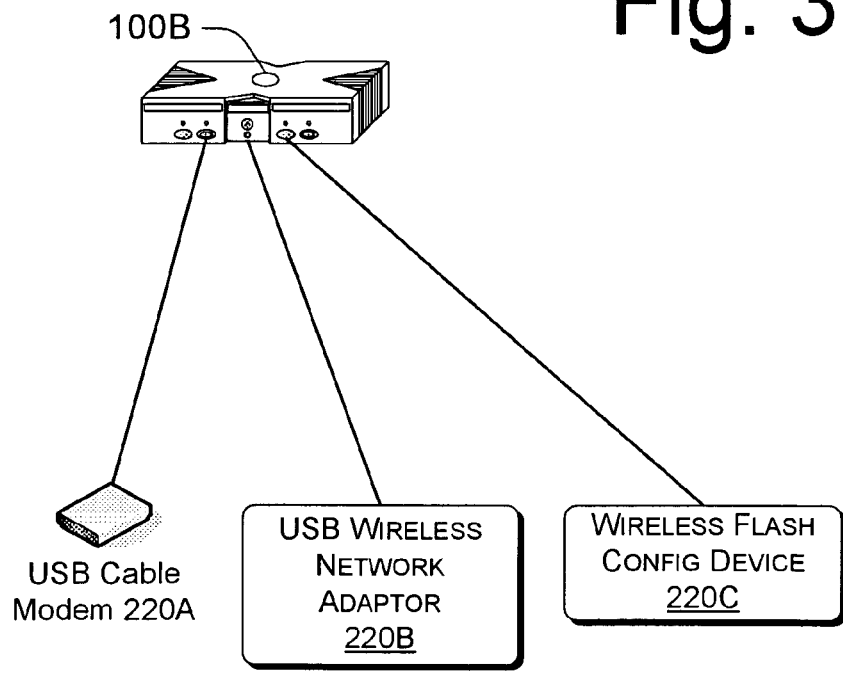

Networking device 220 may be any networking device compatible with the communication ports of game console 100 (i.e., USB controller 128) including, for example, USB cable modem 220A, USB wireless adaptor 220B, wireless flash configuration device 220C, and the like, as shown in FIG. 3b.

Figure 4A:
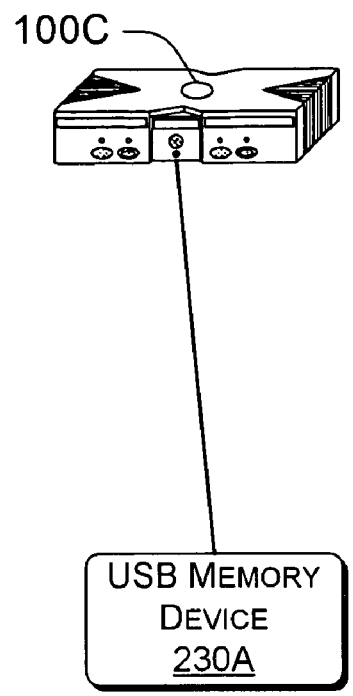

Portable storage device 230 may be any portable storage device compatible with the communication ports of game console 100 (i.e., USB controller 226) including, for example, USB memory device 230A, and the like, as shown in FIG. 4a.

Figure 4B:
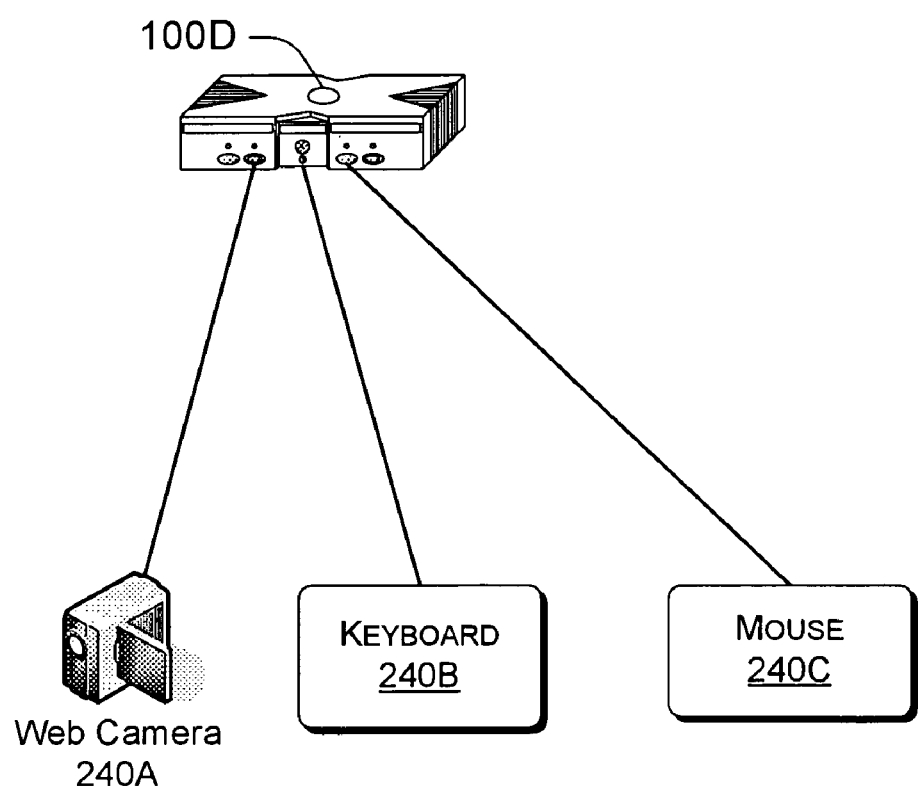

Communication device 240 may be any communication device compatible with the communication ports of game console 100 (i.e., USB controller 228) including, for example, web camera 240A, keyboard 240B, mouse 240C, and the like, as shown in FIG. 4b.

The variety of portable devices available for connection to a USB port may communicate in accordance with a variety of protocols or standards. For example, portable devices may communicate in accordance with Media Transfer Protocol (MTP), Picture Transfer Protocol (PTP), a protocol consistent with the USB Mass Storage Specification, HID driver protocol, Firewire protocol, a proprietary protocol, and the like. Game console 100 may support many protocols, a single protocol, or any combination of protocols. For example, game console 100 may support only the MTP protocol. Alternatively, game console 100 may support the MTP protocol, the PTP protocol, and the HID driver protocol, but not support any proprietary protocols. Further, game console 100 may support multiple proprietary protocols so that many devices using various proprietary protocols may communicate with game console 100.

Game console 100 may provide support for particular protocols by implementing a driver (consistent with the particular protocol) that is used to communicate between the game console 100 (e.g., an ancillary application of game console 100) and a portable device connected to a USB port of game console 100. The drivers are typically associated with only a single protocol, however, the drivers may be associated multiple protocols (and thus be able to communicate in accordance with multiple protocols). The drivers may be stored in system memory 143, in ROM 106, in media drive 144, or the like.

A driver may support only a portion of a particular protocol in order to conserve memory consumption in game console 100. For example, if a particular protocol includes a reference to logging functionality, the driver may not include the functionality to support logging. Thus, the driver may support only a subset of a particular protocol's features. The unsupported functions are typically features or functions that are typically not critical.

The MTP protocol driver (as well as the other protocol drivers) may be implemented in three portions. The lowest third portion of the driver being an abstraction of the bus, the middle portion being the implementation of basic MTP logic, and the top portion being an Application Programming Interface (API) that allows for the use of MTP logic. The MTP protocol driver (as well as other protocol drivers) may be optimized by not including all of the functionality of the MTP protocol, as described above. For example, the MTP protocol driver may not support driver-level caching, logging capabilities, and the like. This reduces the size of the driver, thereby allowing the MTP protocol driver to fit more comfortably into the memory reserved for non-gaming or ancillary applications or allowing additional drivers to be loaded into the memory reserved for non-gaming or ancillary applications. In this manner, game console 100 may support communication with more types of portable devices.

Game console 100 may load drivers associated with the supported protocols upon startup or power-up of game console 100. Alternatively, game console 100 may load the appropriate driver when a portable device associated with that driver is connected to one of the USB controllers of game console 100.

Figure 5:
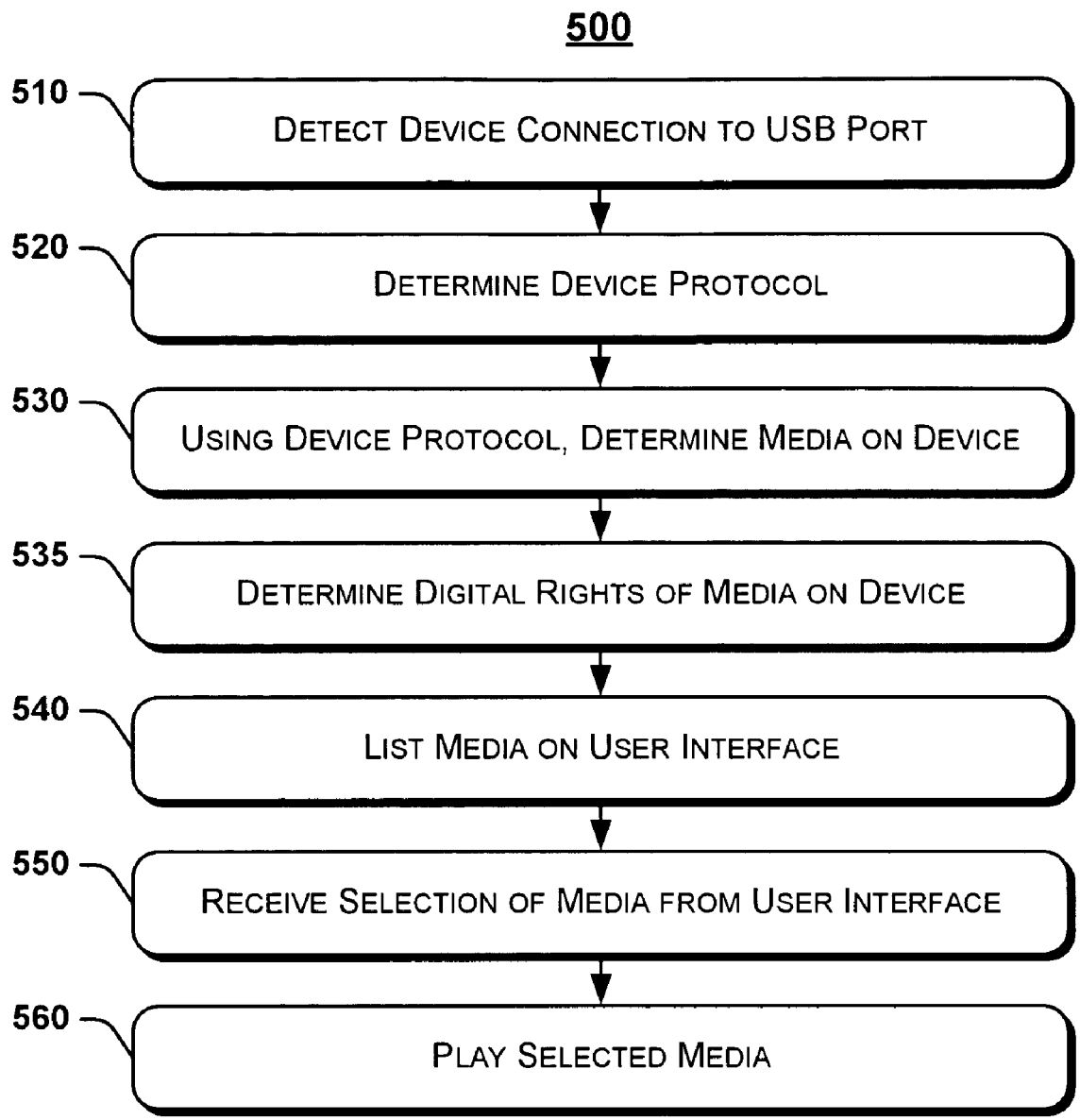
FIG. 5 is a flowchart of an illustrative method for facilitating communication between the illustrative game console of FIG. 1 and various devices, in accordance with an aspect of the invention.

Turning now to FIG. 5, it shows an illustrative method 500 for game console 100 to communicate with portable media device 210 or portable storage device 230. As shown in FIG. 5, at step 510, game console 100 detects that portable media device 210 or portable storage device 230 has been connected to USB controller 126 of game console 100. The detection of portable device connection may include any conventional technique for detecting that a device has been connected to a communication controller, such as, for example, the Plug and Play peripheral model and the like. Detection of portable device connection may cause the launching of an ancillary application or multiple ancillary applications for communicating with the portable device. Each ancillary application may implement a single or multiple steps of FIG. 5, directly or via a driver. A first ancillary application (or multiple ancillary applications) may handle the detection of the connection of the portable device, and in turn launch other ancillary applications for communicating with the portable device. The ancillary applications may interface with a driver (which may be launched on startup or later at step 520) for communicating with the portable device.

At step 520, game console 100 determines the protocol associated with the connected portable media device 210 or portable storage device 230 (and may also determine the type of portable device). For example, game console 100 may determine that the portable media device 210 that has been connected to USB controller 126 communicates via the MTP protocol, the PTP protocol, or the like. Alternatively, game console 100 may determine that the portable storage device 230 that has been connected to USB controller 126 communicates in accordance with the USB Mass Storage Specification, a variation of the USB Mass Storage Specification, or the like. Game console 100 may also determine that portable media device 210 or portable storage device 230 communicates via some proprietary protocol. The proprietary protocols may be device specific, may be manufacturer specific, or the like.

At step 530, game console 100 uses the driver associated with the protocol determined at step 520 to communicate with portable media device 210 or portable storage device 230 and to determine the media (e.g., files, and the like) on the portable media device 210 or portable storage device 230. For example, game console 100 may communicate with digital camera 210B via the PTP protocol and determine that digital camera 210B is storing ten digital photographs in the Joint Photographic Expert Group (JPEG) format (i.e., ten JPEG files). Game console 100 may communicate with USB memory device 230A in accordance with the USB Mass Storage Specification and determine that USB memory device 230A is storing ten digital photographs in the JPEG format (i.e., ten JPEG files).

At optional step 535, game console 100 may determine the digital rights associated with the media files determined at step 530. For example, game console 100 may determine that there are no digital rights associated with the ten JPEG files stored on digital camera 210B or stored on USB memory device 230A. In such a case, game console 100 may proceed directly to step 540. Alternatively, game console 100 may determine that there are some digital rights associated with the media stored on portable media device 210 or portable storage device 230. In such a case, game console 100 may not proceed directly to step 540, but may instead end any processing associated with portable media device 210 or portable storage device 230, may allow the user to only view metadata associated with the media files (e.g., the names of the media files), may allow the user to access ("play") the media files but not forward or copy the media files, and the like.

At step 540, game console 100 displays a list of the media files stored on portable media device 210 or portable storage device 230 on the user interface associated with game console 100 (e.g., on a television via A/V port 140). For example, game console 100 may display a list of the names of the ten JPEG files found on digital camera 210B or USB memory device 230A. Game console 100 may start an ancillary application that interfaces with the user and determines how the user wishes to interact with the media files. The ancillary application typically runs within the processing time left over from the processing time dedicated to the gaming application. If, however, no gaming application is executing, the ancillary application may be the only application running, and thus may not be restricted in its execution. In such a case, upon execution of a gaming application, the ancillary application may be stopped and the gaming application may then execute using its normally dedicated resources.

At step 550, the ancillary application (e.g., via game controller 190 or other input device), receives a selection from a user for a particular media file stored on portable media device 210 or portable storage device 230. For example, using game controller 190, a user may input and game console 100 may receive a selection of the first of the ten JPEG files on digital camera 210B. Further, using game controller 190, the user may input and game console 100 may receive a selection to display each of the ten JPEG files on digital camera 210B consecutively as a slide show.

At step 560, game console 100 plays the selected media file or files. Game console 100 may convert the selected media file from its existing format (e.g., JPEG format) into an appropriate format for display via the audio/visual port 140. For example, game console 100 (via the ancillary application) may convert the first of the ten JPEG files on digital camera 210B into an appropriate format (e.g., for display via audio/visual port 140) and then display the media associated with the media file onto a display device (e.g., a television via the A/V port 140). Game console 100 may play the selected media file by first copying the file to memory 112 or media drive 144 and then playing the media file from memory 112 or media drive 144. Alternatively, game console 100 may play the selected media file by streaming the media file from the portable device to the game console 100.

Game console 100 may execute steps 510 through 560 while the game application is executing. In such a case, steps 510 through 560 are typically executed within the processing time and resources that are not dedicated to the gaming application. Further, if steps 510 through 560 are being executed while the game application is executing, game console 100 may, at step 510 indicate in a non-obtrusive way that game console 100 has detected the connection of a particular USB compatible device and may interact with game controller 190 to receive further processing instructions. For example, game console 100 may display a small icon on the screen to notify the user that game console 100 has detected that a USB compatible device has been connected to the USB controller 126 or 128. The game console 100 may wait for input from game controller 190 before proceeding to display the list of media files at step 540. Alternatively, game console 100 may automatically pause the game application upon detecting that a device has been connected to the USB controller 126 or 128 and wait for receiving user instructions via the game controller 190 to receive further processing instructions.

The method 500 of FIG. 5 enables a variety of user choices for playing media files. For example, a user may take vacation pictures on their digital camera 210B. Then, the user can take the digital camera 210B to their friend's house and plug it into the USB controller of their friend's game console 100 and show their vacation pictures to the friends on a large television display instead of a small camera display. The game console 100 may display (e.g., on a large screen or plasma screen television) a list of the digital pictures on the digital camera 210B (possibly along with small versions of the images) and allow the user to select particular digital pictures or to select showing all of the digital pictures in a slide show format. In this manner, a user can simply plug digital camera 210B into game console 100 and then use the user-friendly interface of game console 100 instead of the digital camera 210B user interface.

Further, a user may take vacation pictures on their digital camera 210B and then store them onto a USB memory device 230A (e.g., via a personal computer). Then, the user can take the portable USB memory device 230A to their friend's house and plug the device 230A into the USB controller of their friend's game console 100 and show their vacation pictures.

Also, a user may store audio (e.g., music) onto audio player 210E and play the music via game console 100. Game console 100 may display a music visualizer (e.g., on a television via A/V port 140) based on the music and thus, provide a much more interesting listening experience.

Additionally, a user may decide that they are tired of listening to the soundtrack of a particular game application and may then download a group of songs onto an audio MP3 player 210E (e.g., from their personal computer via the Internet). Then the user can connect their MP3 player to USB controller 126. Game console 100 detects the connection of MP3 player 210E and displays a Soundtrack menu. The user can then select a particular song or group of songs on the MP3 player and game console 100 plays the user's song selection instead of the game application's default song. Alternatively, a user may use game console 100 to play songs on their MP3 player without playing any game application on game console 100.

Further, a user may connect a smart phone 210A, video camera 210C, PDA 210D, a mobile phone including a camera and storage for media files, and the like to game console 100 and play media files stored on smart phone 210A, video camera 210C, PDA 210D, in a similar manner as described above.

Figure 6:
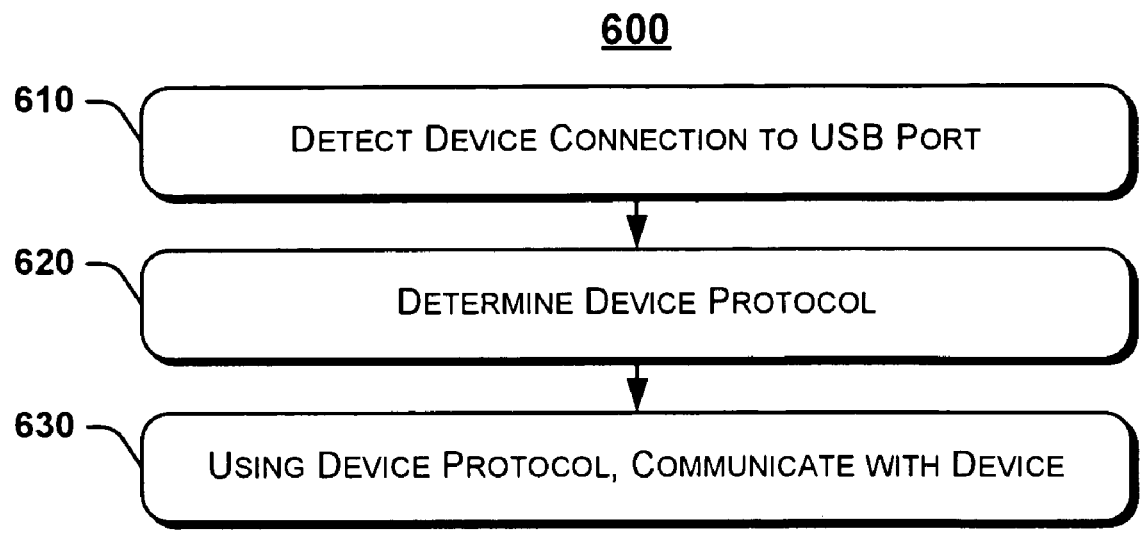
FIG. 6 is a flowchart of another illustrative method for facilitating communication between the illustrative game console of FIG. 1 and various devices, in accordance with an aspect of the invention.

FIG. 6 shows an illustrative method 600 for game console 100 to communicate with networking device 220 or communication device 240. As shown in FIG. 6, at step 610, game console 100 detects that networking device 220 or communication device 240 has been connected to USB controller 128 or 228 of game console 100. Detection of portable device connection may cause the launching of an ancillary application or multiple ancillary applications for communicating with the portable device. Each ancillary application may implement a single or multiple steps of FIG. 6, directly or via a driver.

At step 620, game console 100 determines the protocol of the connected networking device 220 or communication device 240 (and may also determine the type of portable device). For example, game console 100 may determine that the USB cable modem 220A or USB wireless network adapter 220B communicates in accordance with the USB Mass Storage Specification. Alternatively, game console 100 may determine that wireless flash configuration device 220C communicates via a proprietary protocol, or the like. Further, game console 100 may determine that web camera 240A, keyboard 240B, or mouse 240C communicates via a proprietary protocol or via an HID mouse driver, or the like At step 630, game console 100 uses the driver associated with the protocol determined at step 620 to communicate with the connected networking device 220 or communication device 240. For example, game console 100 may communicate with web camera 240A thereby providing images to game console 100. Game console 100 may communicate with networking device 220, such as, USB cable modem 220A or USB wireless adapter 220B to provide network capability to game console 100. Further, game console 100 may communicate with communication device 240, such as, keyboard 240B or mouse 240C, thereby providing an alternative user input device (i.e., in addition to game controller 190).

The method 600 of FIG. 6 enables a variety of user choices for networking with game console 100. For example, a user may wish to play online games but may not have a personal computer to access the Internet and some game consoles are not provided with a network interface. Also, some Internet Service Providers may only allow access via cable modems and some game consoles are not provided with internal cable modems. Connecting an external cable modem 220A to game console 100 enables access to the Internet regardless of the networking hardware provided with the game console.

Further, connecting a keyboard or mouse enables a user to interact with a gaming application via the keyboard 240B or mouse 240C, in addition to the conventional game controller

190. Connection of web camera 240A may enable video chat, instant messaging with video images, community lounges, and the like.

Figure 7:
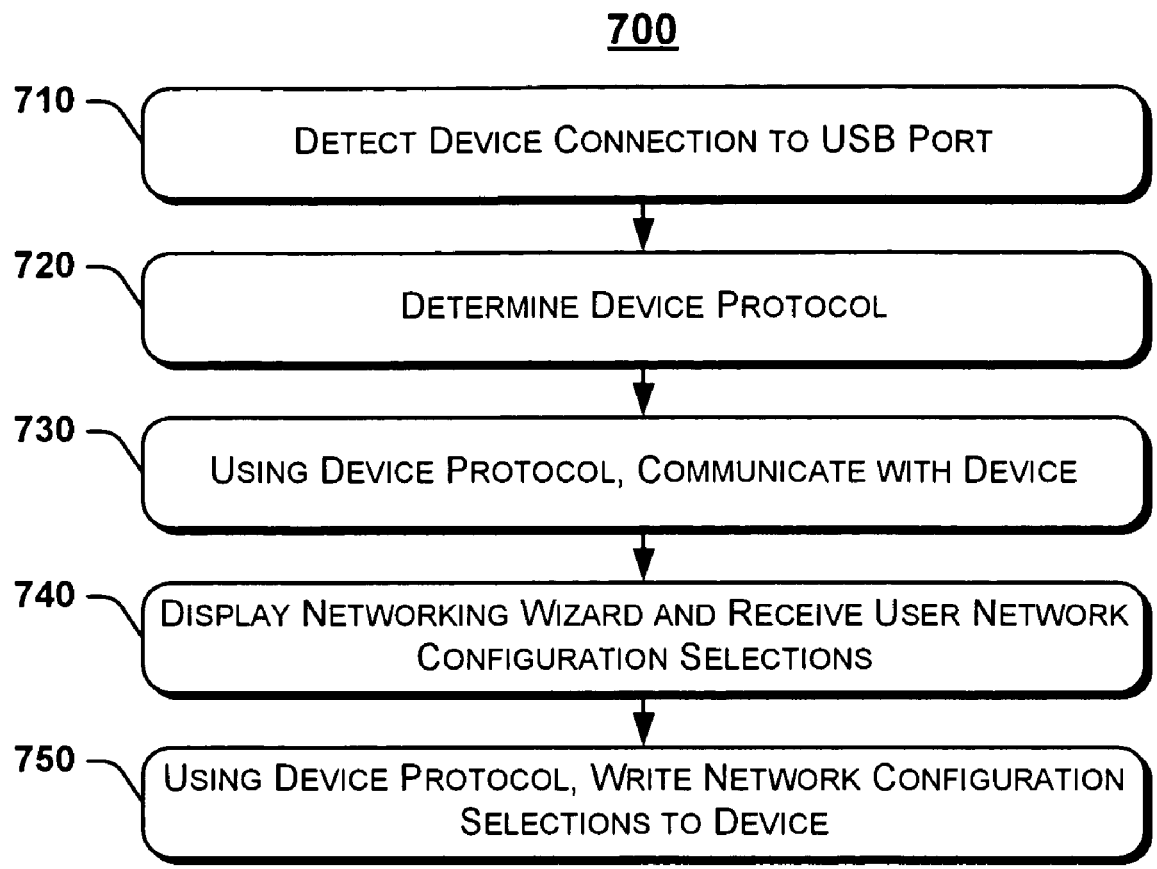
FIG. 7 is a flowchart of yet another illustrative method for facilitating communication between the illustrative game console of FIG. 1 and various devices, in accordance with an aspect of the invention.

FIG. 7 shows an illustrative method 700 for game console 100 to communicate with wireless flash configuration device 220C. As shown in FIG. 7, at step 710, game console 100 detects that wireless flash configuration device 220C has been connected to USB controller 226 of game console 100. Detection of portable device connection may cause the launching of an ancillary application or multiple ancillary applications for communicating with the portable device. Each ancillary application may implement a single or multiple steps of FIG. 7, directly or via a driver.

At step 720, game console 100 determines the protocol of the connected wireless flash configuration device 220C (and may also determine the type of portable device). For example, game console 100 may determine that the portable media device 210 communicates in accordance with the USB Mass Storage Specification. Game console 100 may also determine that wireless flash configuration device 220C communicates via some proprietary protocol.

At step 730, game console 100 uses the driver associated with the protocol determined at step 720 to communicate with wireless flash configuration device 220C.

At step 740, game console 100 displays a networking configuration wizard and receives user inputs in response to displayed prompts for network information from the configuration wizard.

At step 750, game console 100, writes the network configuration information to the wireless flash configuration device 220C using the determined protocol. In this manner, a user may utilize a convenient user-friendly interface (via game console 100) to configure their wireless network (e.g., their home wireless network, which may not include game console 100), rather than dealing with the complexity of configuring the wireless network using a personal computer.

Game console 100 may execute steps 710 through 750 while the game application is executing. In that case, steps 710 through 750 are typically executed within the processing time and resources that are not dedicated to the gaming application. Further, if steps 710 through 750 are being executed while the game application is executing, game console 100 may, at step 710 indicate in a non-obtrusive way that game console 100 has detected the connection of a particular USB device and may interact with game controller 190 to determine how to proceed. For example, game console 100 may display a small icon, sometimes called a "notification," on the screen to notify the user that game console 100 has detected a portable device being connected to USB controller 126 or 128. Alternatively, game console 100 may automatically pause the game application upon detecting that a device has been connected to the USB controller 126 or 128 and wait to receive user instructions via the game controller 190 to determine how to proceed.

The connectivity between game console 100 and various portable devices provides increased flexibility for gaming, also. For example, a user may store gaming application data on USB memory device 230A, thus making that data portable. For example, a user may store a game-clip (also referred to as a "ghost race", a "highlight", a "highlight race", or a "saved game") onto USB memory device 230A. Thus, the game clip can be carried to a friend's game console on the USB memory device 230A. Game console 100, in such a case, would provide a user interface for both storing gaming application data to the USB memory device 230A and uploading the stored gaming application from the USB memory device 230A to another game console. Game demos are other game-related data that may be stored and uploaded to/from USB memory device 230A.

Other gaming data that may be stored on USB memory device 230A includes gaming configuration data also called a "gamer profile." For example, game console 100 may store game related configuration settings, such as, a "left handed" game controller 190 configuration to USB memory device 230A. In this manner, a user can carry USB memory device 230A to their friend's house and be able to upload that "left handed" game controller 190 configuration to their friend's game console 100.

Further gaming data that can be stored and uploaded via USB memory device 230A includes a team icon, a custom playbook/roster, a player emblem, a log of last played games, customization, a racing game suspension setting, a racing game bike model or color, a racing game suit color, and the like. If the user then plays the game at a friend's house, the user can access the stored game settings via the USB memory device 230A by uploading his game configuration settings to the game console 100 at the friend's house.

Aspects of the invention may be implemented via computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It should be noted that although the game console discussed herein is described as a dedicated game console (not a general-purpose PC running computer games), the game console may also incorporate additional functionality. For example, the game console may be a multimedia console and may include digital video recording functionality so that it can operate as a digital VCR, the game console may include channel tuning functionality so that it can tune and decode television signals (whether they be broadcast signals, cable signals, satellite signals, etc.), and so forth. Further, in alternate embodiments, the game console is replaced with a set top box or other computing device.

As the foregoing illustrates, the invention is directed to game console communication to portable devices. It is understood that changes may be made to the illustrative embodiments described above without departing from the broad inventive concepts disclosed herein. Accordingly, it is understood that the invention is not limited to the particular embodiments disclosed, but is intended to cover all modifications that are within the spirit and scope of the invention as defined by the appended claims.

What is claimed:

1. A computer implemented method for communication between a game console having a communication port and a portable device, the method comprising:

reserving a first predetermined amount of hardware resources of a game console for executing a game application, the first predetermined amount of hardware resources reserved for later use by only the game application and made unavailable to other applications regardless of amount of resources used by the game application;

reserving a second predetermined amount of hardware resources different than the first predetermined amount of hardware resources which allow communication between the game application and an ancillary application to allow one or the other of the game application and the ancillary application having user input focus to transmit user input information to the other of the game application and the ancillary application not having user input focus;

executing the game application using the first predetermined amount of reserved hardware resources;

upon detecting that a portable device has been communicatively coupled to a communication port of the game console, launching the ancillary application, the ancillary application:

concurrently executing using remaining hardware resources to communicate between the game console and the portable device, determining a protocol associated with the portable device, and communicating with the portable device via a driver compatible with the determined protocol, the driver supporting a subset of features provided by the determined protocol and occupying less memory than a full-featured driver; and upon receipt of a request at the ancillary application, the request requiring action by the game application, the ancillary application transmitting information regarding the request to the second predetermined amount of hardware resources which causes the game application to pause.

2. The method as recited in claim 1, wherein reserving the first predetermined amount of hardware resources comprises reserving a predetermined amount of memory for the game application.

3. The method as recited in claim 1, wherein reserving the first predetermined amount of hardware resources comprises reserving a portion of central processing unit time for the game application.

4. The method as recited in claim 1, wherein the communication port is a Universal Serial Bus port.

5. The method as recited in claim 1, wherein determining the protocol associated with the portable device comprises determining that the protocol is a Media Transfer Protocol.

6. The method as recited in claim 5, wherein communicating with the portable device comprises communicating via a Media Transfer Protocol compatible driver supporting only a subset of features supported by the Media Transfer Protocol.

7. The method as recited in claim 1, wherein determining the protocol associated with the portable device comprises determining that the protocol is a Universal Serial Bus protocol.

8. The method as recited in claim 7, wherein communicating with the portable device comprises communicating with the portable device via a Universal Serial Bus Mass Storage Specification compatible driver supporting only a subset of features supported by the Universal Serial Bus Mass Storage Specification.

9. The method as recited in claim 1, wherein communicating with the portable device comprises one of writing a game controller configuration setting to the portable device and receiving a game controller configuration setting from the portable device.

10. The method as recited in claim 1, wherein communicating with the portable device comprises one of writing a game application configuration setting to the portable device and receiving a game application configuration setting from the portable device.

11. The method as recited in claim 1, further comprising:

determining a media file stored on the portable device;

writing an indication of the media file to an audio/visual port for display on a display device;

receiving a user selection of the media file; and playing the selected media file.

12. The method as recited in claim 11, wherein playing the selected media file comprises playing a slide show of digital photographs.

13. The method as recited in claim 1, further comprising:

writing wireless network configuration prompts to an audio/visual port for display on a display device;

receiving wireless network configuration information from an input device of the game console; and storing the received wireless network configuration information to a Universal Serial Bus flash configuration device connected to the communication port.

14. The method as recited in claim 1, wherein determining that a portable device has been directly connected to the communication port comprises determining that a portable networking device has been directly connected to the communication port and further comprising providing network communication to the game console via the portable networking device.

15. The method as recited in claim 1, the step of reserving a second predetermined amount of hardware resources further comprising reserving a second predetermined amount of memory for storing the transmitted user input information.

16. The method as recited in claim 1, further comprising sharing an input device between the game application and the ancillary application.

17. A computer implemented method for communication between a game console having a communication port and a portable device, the method comprising:

reserving a first predetermined amount of hardware resources of a game console for executing a game application, the first predetermined amount of hardware resources reserved for later use by only the game application and made unavailable to other applications regardless of amount of actual resources used by the game application;

reserving a second predetermined amount of hardware resources different than the first predetermined amount of hardware resources which allow communication between the game application and an ancillary application to allow one or the other of the game application and the ancillary application having user input focus to transmit user input information to the other of the game application and the ancillary application not having user input focus;

executing the game application using the first predetermined amount of reserved hardware resources;

upon detecting that a portable device has been communicatively coupled to a communication port of the game console, launching the ancillary application, the ancillary application:

concurrently executing using remaining hardware resources to communicate between the game console and the portable device, determining a protocol associated with the portable device, communicating with the portable device via a driver compatible with the determined protocol, the driver supporting a subset of features provided by the determined protocol and occupying less memory than a full-featured driver identifying a media file stored on the portable device;

writing an indication of the media file to an audio/visual port for display on a display device;

receiving a user selection of the media file; and playing the selected media file; and upon receipt of a request at the ancillary application, the request requiring action by the game application, the ancillary application transmitting information regarding the request to the second predetermined amount of hardware resources which causes the game application to pause.

* * * * *